(12) United States Patent
Zhou et al.

(10) Patent No.: US 10,811,868 B2
(45) Date of Patent: Oct. 20, 2020

(54) ELECTRICAL SYSTEM AND METHOD FOR PROTECTING A DC/DC CONVERTER

(71) Applicant: Valeo Siemens eAutomotive France SAS, Cergy (FR)

(72) Inventors: Huan Zhou, Houilles (FR); Gang Yang, Courbevoie (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 0 days.

(21) Appl. No.: 16/674,897

(22) Filed: Nov. 5, 2019

(65) Prior Publication Data

US 2020/0144810 A1 May 7, 2020

(30) Foreign Application Priority Data

Nov. 6, 2018 (FR) ...................... 18 60223

(51) Int. Cl.
*H02M 3/335* (2006.01)
*G05F 1/565* (2006.01)
*H02H 7/12* (2006.01)
*H02M 1/08* (2006.01)
*H02M 1/00* (2006.01)
(Continued)

(52) U.S. Cl.
CPC .......... *H02H 7/1213* (2013.01); *H02M 1/083* (2013.01); *H02M 3/33569* (2013.01); *G05F 1/565* (2013.01); *H02M 3/33507* (2013.01); *H02M 3/33523* (2013.01); *H02M 2001/0058* (2013.01); *H02M 2001/325* (2013.01); *H02M 2007/4815* (2013.01)

(58) Field of Classification Search
CPC ............ G05F 1/565; H02M 2001/325; H02M 3/33507; H02M 3/33523; H02M 2007/4815

USPC ........................................... 363/21.02, 21.03
See application file for complete search history.

(56) References Cited

U.S. PATENT DOCUMENTS 8,391,026 B2 * 3/2013 Santoro .................. H02M 1/36
363/131
9,356,523 B2 * 5/2016 Yoshida .............. H02M 3/3372
(Continued)

FOREIGN PATENT DOCUMENTS

CN 101997421 B 8/2014

OTHER PUBLICATIONS

Search Report from French Intellectual Property Office on corresponding FR application (FR1860223) dated Jun. 24, 2019.

*Primary Examiner* — Gary A Nash
(74) *Attorney, Agent, or Firm* — Klein, O'Neill & Singh, LLP

(57) ABSTRACT

The purpose of the present invention is an electrical system allowing conversion of a direct voltage into another direct voltage, including:
 a resonant DC-DC converter including an LLC converter circuit,
 a control unit including:
  a first module for determining the rms resonance current value from a measurement of the output current,
  a second module for determining a maximum value of the voltage at the terminals of each resonance capacitor and a minimum value of the voltage at the terminals of each resonance capacitor using rms resonance current value,
  a comparison module,
  a disconnection element configured to stop operation of the resonant DC-DC converter in the event of an overload.

11 Claims, 4 Drawing Sheets

(51) Int. Cl.
*H02M 1/32* (2007.01)
*H02M 7/48* (2007.01)

(56) References Cited

U.S. PATENT DOCUMENTS

| | | | |
|---|---|---|---|
| 2013/0099787 A1* | 4/2013 | Lu | H02M 3/3376 |
| | | | 324/319 |
| 2014/0009968 A1* | 1/2014 | Matsuura | H02M 3/33592 |
| | | | 363/17 |
| 2014/0160800 A1* | 6/2014 | Zimmanck | H02M 3/3376 |
| | | | 363/17 |
| 2014/0268907 A1 | 9/2014 | Cinagrossi et al. | |
| 2015/0229225 A1 | 8/2015 | Jang et al. | |
| 2017/0163144 A1* | 6/2017 | Boncato | H02M 1/32 |

* cited by examiner

ELECTRICAL SYSTEM AND METHOD FOR PROTECTING A DC/DC CONVERTER

TECHNICAL FIELD

The present invention concerns the field of systems for powering electrical and/or electronic equipment, in particular such systems intended to be installed in a motor vehicle, in particular an electric or hybrid motor vehicle. The present invention concerns more specifically the field of DC-DC converters, i.e. electrical systems enabling a direct-current input voltage to be converted into a direct-current output voltage which is lower or higher than the input voltage.

In a known manner, an electric or hybrid motor vehicle includes an electric motor system, powered by a high-voltage power battery via a high-voltage on-board electrical network, and various auxiliary electrical devices, powered by a low-voltage power battery, via a low-voltage on-board electrical network.

BACKGROUND

FIG. 1 represents a functional block diagram of an on-board electrical system of the state of the art. The HV high-voltage power battery thus implements the function of supplying the electric motor system ENG with energy, enabling the vehicle to be propelled. The LV low-voltage power battery powers the auxiliary electrical devices AUX, such as on-board computers, electric window motors, the multimedia system, etc. The HV high-voltage power battery typically delivers a voltage of between 100 V and 900 V, and preferably between 100 V and 500 V, while the LV low-voltage power battery typically delivers a voltage of the order of 12 V, 24 V or 48 V. These two high- and low-voltage power batteries, HV and LV, must be able to be charged.

Recharging the HV high-voltage power battery with electrical energy is accomplished in a known manner by connecting it, via an electrical charger of the vehicle, to an external electrical power network, for example the G1 domestic AC electrical network. Finally, again with reference to FIG. 1, charging of the LV low-voltage power battery is accomplished in a known manner by the HV high-voltage power battery. For this purpose the system includes a DC10 DC-DC converter.

The electrical charger typically includes an insulated DC-DC converter. A resonant LLC converter is known, illustrated in FIG. 2, comprising two resonance capacitors C3, C4, a resonance coil L1 and a transformer. If the output power of the circuit increases the resonance current of the transformer also increases and, finally, the amplitude of voltage Vr at the terminals of each resonance capacitor C3, C4 increases. When voltage amplitude variations Vr are too great they can cause overloads in resonance capacitors C3 and C4 and at the output of the circuit.

In a known manner, with reference to FIG. 3, to prevent potential damage to the circuit due to an overload, resonance capacitors C3 and C4 must be protected by limiting the voltages at their respective terminals. To accomplish this a first solution consists in placing "ultrafast" diodes, a reference to diodes which switch at very high frequencies, as in the present case, at over 275 kHz, in parallel with resonance capacitors C3 and C4. Thus, when voltage Vr is positive the diode is off, but when voltage Vr is negative the diode is on, and short-circuits the capacitor. This modifies the structure of the circuit, which is therefore no longer an LLC circuit, and no longer operates as one, thus preventing resonance capacitors C3 and C4 from being overloaded.

This solution has disadvantages: in particular the high cost of these "ultrafast" diodes, bearing in mind that two such diodes are required for each circuit. In addition, the two "ultrafast" diodes cannot short-circuit at the same time. Finally, the diode's short-circuit threshold voltage is not adjustable since it is intrinsic to the diode.

To mitigate these disadvantages the present invention proposes an electrical system configured to use a method to detect the overloading of the resonance capacitor, based on a current measurement.

SUMMARY

More specifically, the invention refers to an electrical system enabling a DC voltage to be converted into another DC voltage, including:

- a resonant DC-DC converter including a resonant LLC converter with a resonance inductor, two resonance capacitors and a transformer,
- a control unit including:
  - a first module for determining the average value of the output current of the resonant DC-DC converter over a period called the "evaluation period",
  - a second module for determining a maximum value of the voltage at the terminals of each resonance capacitor, and a minimum value of the voltage at the terminals of each resonance capacitor over the evaluation period, using the average value of the output current,
  - a module to compare a maximum voltage threshold with the maximum value of the voltage at the terminals of each resonance capacitor and to compare a minimum voltage threshold with the minimum value of the voltage at the terminals of each resonance capacitor,
  - a fault element configured to detect a failure of the resonant DC-DC converter if:
    - the said maximum voltage value (Vr_max) is greater than or equal to the maximum voltage threshold (Vr_define_max), or
    - the said minimum voltage value n (Vr_min) is less than or equal to the minimum voltage threshold (Vr_define_min).

This system enables an overload to be detected simply and effectively.

Advantageously, the electrical system's resonant DC-DC converter includes a rectifier, connected to the output of the transformer, and in particular to the transformer's secondary winding.

The said rectifier enables the square wave AC voltage, at the output of the transformer, to be converted into a pulsed rectified voltage, i.e. a variable voltage, but with a constant sign.

The evaluation period is preferably equal to one or more switching periods of the transistors of the resonant DC-DC converter.

In a preferred manner the first determination module is configured to determine the average value of the output current, from a measuring point located at an output terminal of the rectifier, in particular a low-output terminal of the rectifier.

The second module for determining the electrical system is preferably configured to determine the maximum voltage value and the minimum voltage value from the input voltage of the resonant DC-DC converter, the rms value of the resonance current, the switching frequency of the resonant DC-DC converter, and the value of the resonance capacitor.

The maximum voltage value and minimum voltage value are thus determined precisely.

Advantageously, the electrical system includes an electrical filter connected to the output of the rectifier of the resonant DC-DC converter.

The filter enables the quality of the signal being output from the DC-DC converter to be improved.

Advantageously, the electrical system's comparison module is configured such that:
the said maximum voltage threshold is a maximum authorised voltage value at the terminals of the resonance capacitor, above which in particular the said capacitor is overloaded, and
the said minimum voltage threshold is a minimum authorised voltage value at the terminals of the resonance capacity, below which in particular the said resonance capacitor is overloaded.

The maximum voltage threshold and the minimum voltage threshold can be modified, and thus be modified to suit the context of the system.

Advantageously, the electrical system's fault element includes a disconnection element configured to stop operation of the resonant DC-DC converter in the event of a fault.

The invention also concerns an method for detecting an overload of a resonant DC-DC converter used in an electrical system including a resonant DC-DC converter including a resonant LLC converter circuit which includes a resonance inductor, two resonance capacitors and a transformer, where the said method is characterised by the fact that it includes steps of:
  determination, in particular of measurement, of the output current,
  determination of the average value of the said output current, over a period known as the "evaluation period",
  determination of a maximum value of the voltage at the terminals of each resonance capacitor, and a minimum value of the voltage at the terminals of each resonance capacitor over the evaluation period, using the average value of the output current, determined in the previous step,
  comparison of a maximum voltage threshold with the maximum value of the voltage at the terminals of each resonance capacitor and comparison of a minimum voltage threshold with the minimum value of the voltage at the terminals of each resonance capacitor,
  detection of a fault in the resonant DC-DC voltage converter if the said maximum voltage value is greater than or equal to the maximum voltage threshold, and/or if the said minimum voltage value is less than or equal to the minimum voltage threshold.

In a preferred manner, the method's fault-detection step is the detection of an overload of a resonance capacitor.

Advantageously, the method includes, after the fault-detection step, a step of disconnection of the resonant DC-DC converter, in which operation of the resonant DC-DC converter is stopped.

The method enables the electrical system, and in particular the DC-DC converter, to be protected, in order to prevent possible damage to certain components of the system, in particular the resonance capacitors, and therefore to prevent erroneous operation of the system.

In a preferred manner, the maximum value of the voltage at the terminals of each resonance capacitor is determined using the following formula:

$$V_{r\_max} = \frac{1}{2}V_{in} + \frac{\sqrt{2}}{C_r 2\pi F_s} \sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

and the minimum value (Vr_min) of the voltage at the terminals of each resonance capacitor (Cr/2) is determined using the following formula:

$$V_{r\_min} = \frac{1}{2}V_{in} - \frac{\sqrt{2}}{C_r 2\pi F_s} \sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

where Vin is the input voltage of the resonant DC-DC converter, Cr is the value of the resonance capacitors, Fs is the switching frequency of the resonant DC-DC converter, N refers to the transformer's transformation ratio, Is_avrg is the average value of the output current, Vout is the output voltage and Lm refers to the transformer's primary magnetizing inductance.

BRIEF DESCRIPTION OF THE DRAWINGS

The invention will be better understood on reading the following description, given only as an example, which makes reference to the appended drawings, given as non-restrictive examples, in which identical references are given to similar objects, and in which.

It should be noted that the figures explain the invention in detail in order to implement the invention, and that the said figures can of course be used to improve the definition of the invention, if applicable.

DETAILED DESCRIPTION

It should be noted that the present invention is described below using different non-restrictive implementations, and may be implemented using variants within the understanding of a person skilled in the art, to which the present invention also refers.

Figure 1:
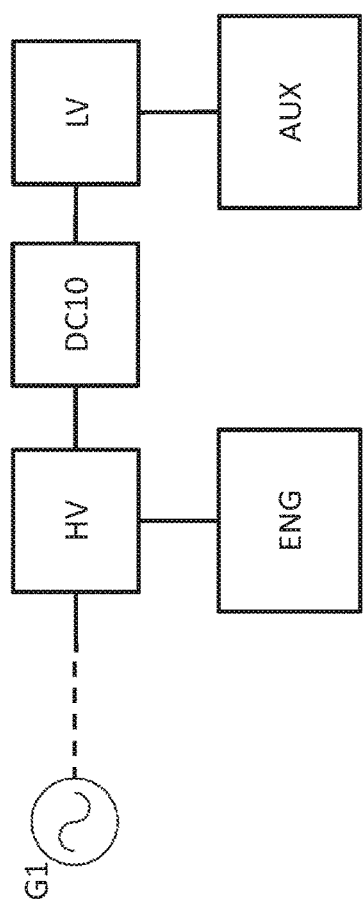
FIG. 1 (previously commented), the functional block diagram of an electrical system according to the state of the art.
Figure 2:
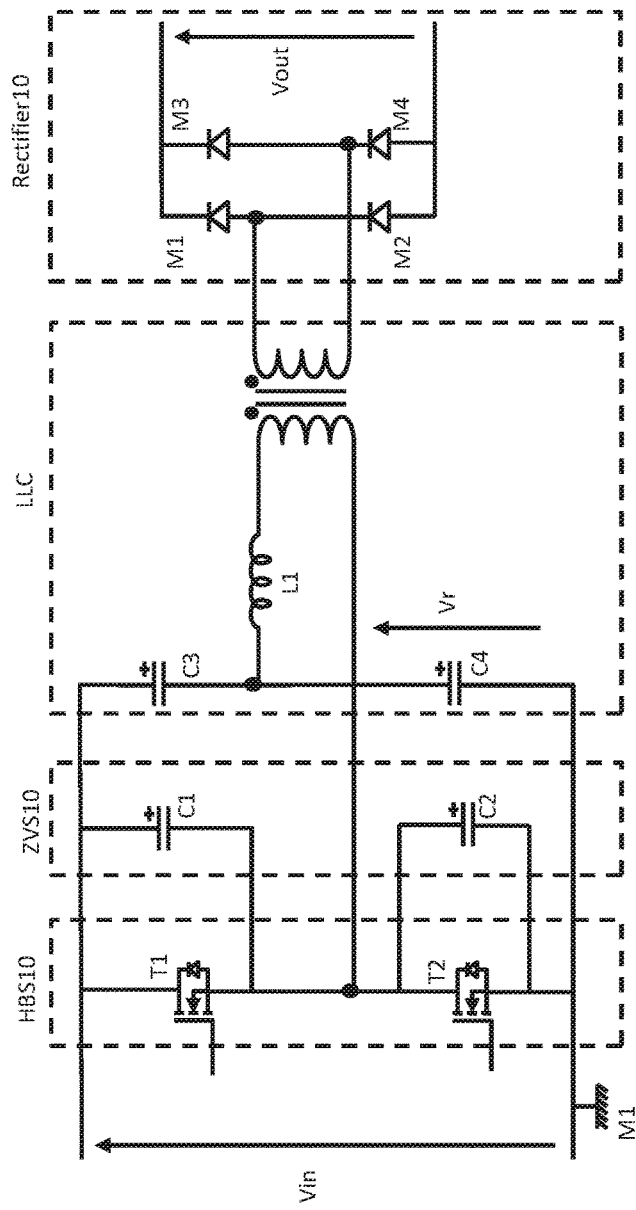
FIG. 2 (previously commented), an electronic diagram of an electrical system according to the state of the art.
Figure 3:
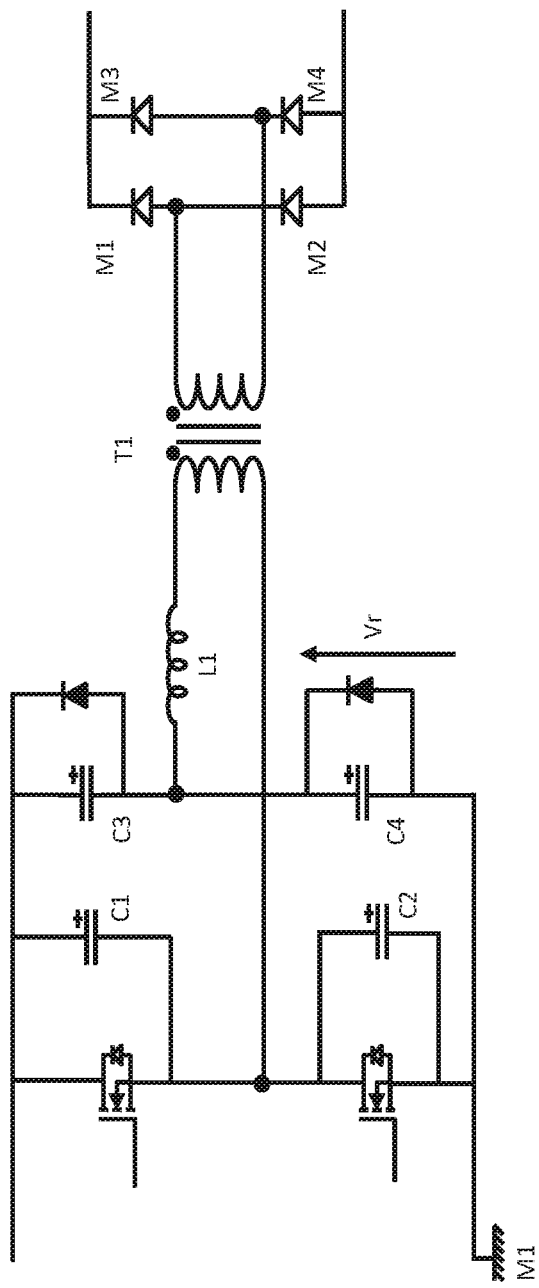
FIG. 3 (previously commented), an electronic diagram of an electrical system according to the state of the art.
Figure 4:
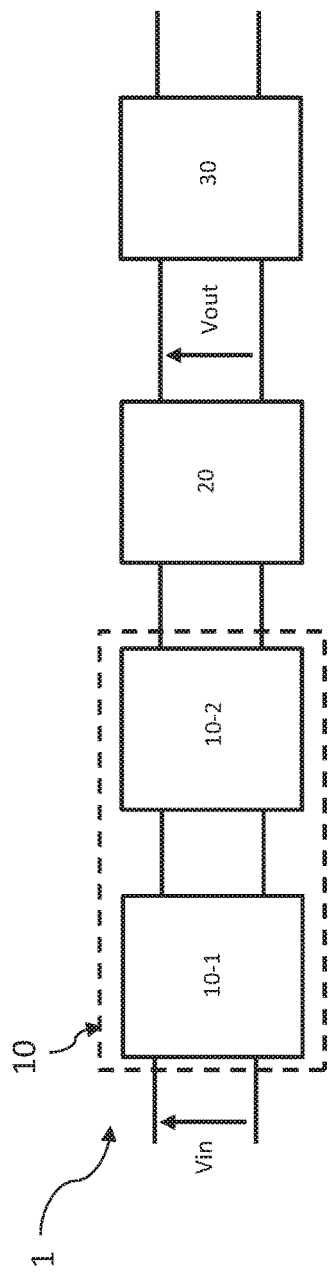
FIG. 4, the functional block diagram of an electrical system according to the invention, FIG. 5, the electronic diagram of the electrical system of FIG. 4, FIG. 6, a block diagram representing the overload detection method according to the invention.

FIG. 4 represents a functional block diagram of a form of implementation of the electrical system according to the invention. This electrical system is intended, in particular, to be installed in an electric or hybrid motor vehicle. The invention concerns a resonant DC-DC converter 1.

With reference to FIG. 4, the electrical system includes a resonant DC-DC converter 1, including a converter circuit 10, a rectifier 20, connected to the output of said converter circuit 10, and a filter 30, connected to the output of said rectifier 20. Filter 30 can be omitted. Resonant DC-DC converter 1 enables a DC voltage to be converted into another DC voltage; the detailed topology of this converter will be described in detail in a later part. Converter circuit 10 includes a first circuit 10-1 and a second circuit 10-2, enabling, in particular, a square wave AC voltage to be obtained, or in other words a sinusoidal current, from a DC voltage. Rectifier 20 enables a square wave AC voltage to be converted into a pulsed rectified voltage, i.e. a variable voltage, but with a constant sign. Filter 30 enables the voltage obtained in the previous step to be "smoothed", i.e. enables the average value of the input voltage of filter 30 to be obtained at the output of filter 30.

Figure 5:
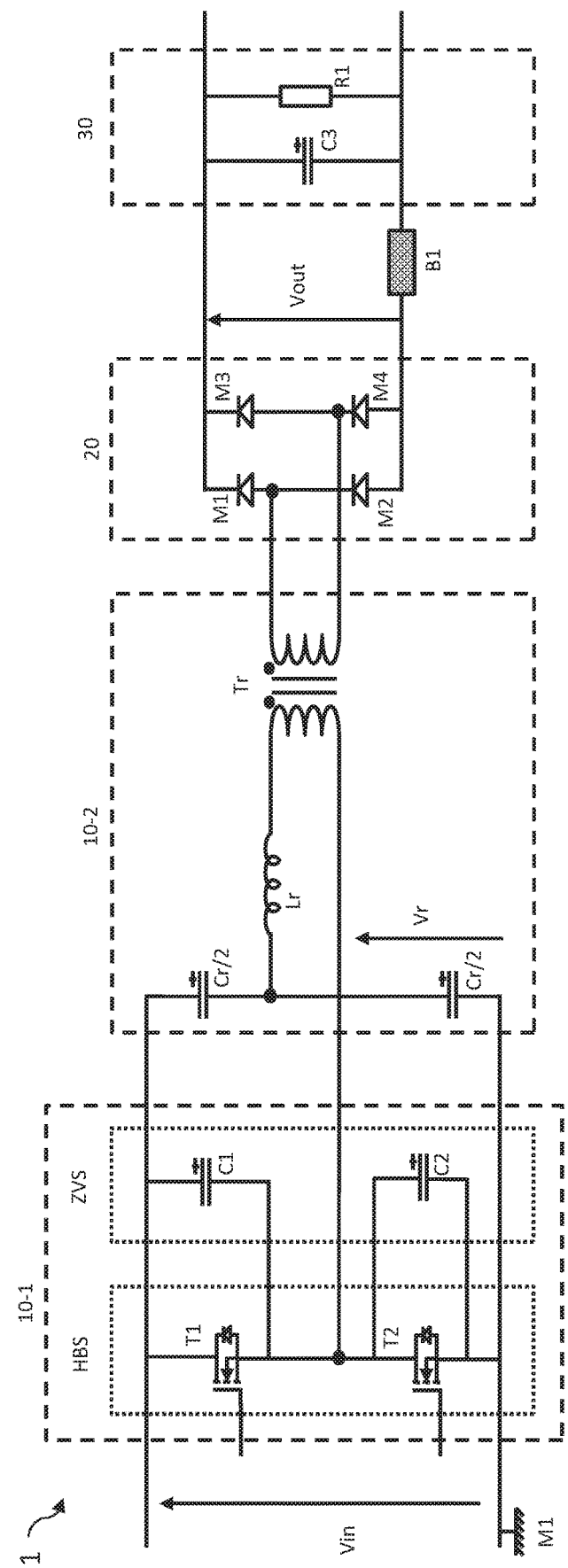

FIG. 5 represents the detailed topology of the electrical system presented in FIG. 4, i.e. of a resonant DC-DC converter 1. In this detailed implementation first circuit 10-1 of converter circuit 10 of resonant DC-DC converter 1 includes a circuit called an "HBS" circuit, where this acronym stands for "Half Bridge Switches". In addition, second circuit 10-2 of converter circuit 10, connected to first circuit 10-1, includes a resonant LLC converter circuit, the structure of which is known to a person skilled in the art.

The HBS circuit includes two transistors T1 and T2, in particular field-effect transistors, and performs as a switch mode power supply, with transistors T1, T2 operating in switching mode. Losses may occur on activation and deactivation of each transistor T1, T2. Capacitors C1, C2 can be connected respectively in parallel with transistors T1, T2 to enable zero-voltage switching (ZVS), and to minimize losses due to switching, and thus to obtain a higher switching frequency for transistors T1 and T2. Again with reference to FIG. 5, the resonant LLC converter of second circuit 10-2 includes a resonance inductor Lr, two resonance capacitors Cr/2, a first capacitor of which is connected with an high terminal of first circuit 10-1, and a second capacitor of which is connected to a low terminal of first circuit 10-1, the two resonance capacitors Cr/2 being connected to their other terminal in a middle point, and a transformer Tr, which has a magnetizing inductor in the primary winding.

Rectifier 20 can be a four-diode bridge to allow voltage rectification. Indeed, a square wave AC voltage, changing from positive to negative, is rectified as a periodic voltage of constant sign, either positive or negative.

In addition, again with reference to FIG. 5, filter 30 can include a resistor R1 and a capacitor C3 mounted in parallel, or simply a capacitor mounted in parallel with rectifier 20 or alternatively an LC filter.

When the input voltage of filter 30, corresponding to the output voltage of rectifier 20, increases, capacitor C3 is charged. Then, when the input voltage of filter 30 is reduced, capacitor C3 discharges. But, in a known manner, a capacitor is charged and is discharged "slowly", and therefore the amplitude of the voltage delivered at the output of filter 30 is much lower than that of the input voltage of filter 30, or almost zero. The voltage at the output of filter 30 is thus almost a direct-current voltage.

Detection of a potential overload of one of resonance capacitors Cr/2 is accomplished by measuring output current Is at a measurement point B1 taken at the output of rectifier 20.

In addition, to detect a potential overload of a resonance capacitor Cr/2, the electrical system includes a control unit TN. Control unit TN is in particular a digital processing device. Said control unit TN includes a first determination module TN1, a second determination module TN2, including a comparison module TNC, and a fault detection element UP. Control unit TN is connected, in particular, by its first determination module TN1 to measurement point B1. Fault detection element UP can be a transistor control unit, commonly called a "driver" by a person skilled in the art.

Figure 6:
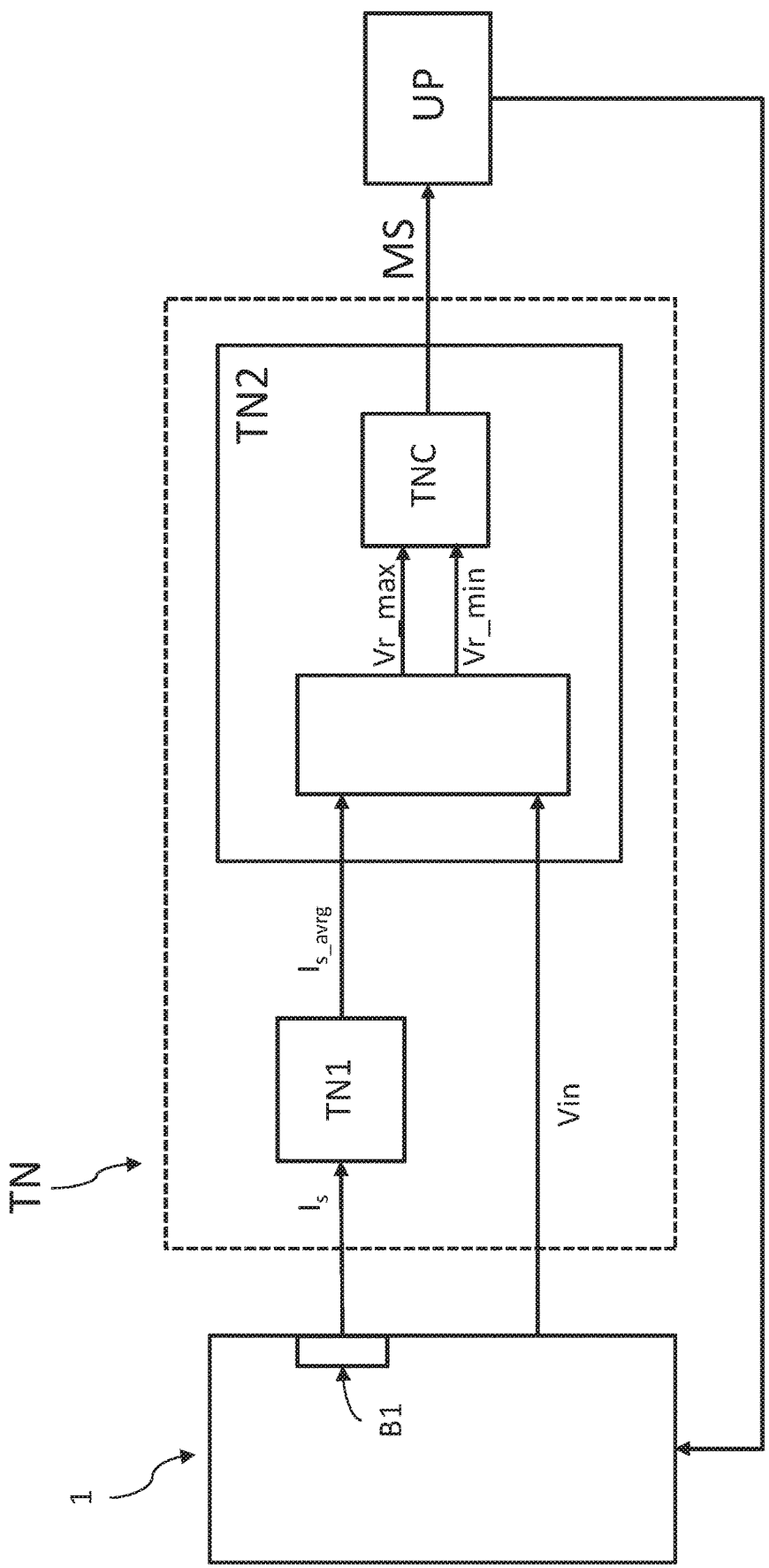

With reference to FIG. 6, an implementation of the method for detecting an overload of a resonant DC-DC converter 1 is represented.

Step 1: Determination of the Rms Resonance Current Value Ir_RMS

First determination module TN1 determines average value Is_avg of output current Is, measured at a measuring point B1 at a low output terminal of rectifier 20 of resonant DC-DC converter 1, over a period T known as the "evaluation period". This evaluation period T can extend over one or more switching periods of transistors T1, T2 and can include a portion of a switching period.

Average value Is_avg of output current Is is also related to rms resonance current value Ir_RMS.

Indeed, by applying Kirchhoff's current law to the node located at the low terminal of the primary magnetizing inductor of transformer Tr, rms value of the resonance current Ir_RMS is defined by the following formula:

$$I_{r\_RMS} = \sqrt{I_s^2 + I_m^2} \qquad (1)$$

It should be noted that Is refers to the measurement of the output current and Im refers to the current in the primary magnetizing inductor of transformer Tr.

Then, when the values of output current Is and of the current in the primary magnetising inductor Im are replaced by their respective expressions, in expression (1), the following expression is obtained:

$$I_{r\_RMS} \approx \sqrt{(N \times I_{s\_RMS})^2 + \left(\frac{V_{out}}{4\sqrt{3} \times N \times F_s \times L_m}\right)^2} \qquad (1bis)$$

It should be noted that N refers to the transformation ratio of transformer Tr defined mathematically by the ratio of the number of coils of the secondary inductor to the number of coils of the primary inductor of transformer Tr. In addition, Lm refers to the primary magnetizing inductor of transformer Tr, Vout refers to the output voltage of rectifier 20, Fs refers to the switching frequency of resonant DC-DC converter 1, and therefore in the present case the switching frequency of transistors T1, T2 and Is_RMS defines the rms value of the output current.

It is also known that rms output current value Is_rms is defined using the following formula:

$$I_{s\_RMS} = I_{s\_avg} \times \frac{\pi}{2\sqrt{2}}.$$

Thus, if in (1 bis) rms output current value Is_rms is replaced by its expression, one obtains:

$$I_{r\_RMS} \approx \sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2} \qquad (1ter)$$

Thus, equation (1 ter) demonstrates that average value Is_avg of output current Is, determined by first determination module TN1, is mathematically related to rms resonance current value Ir_RMS.

Step 2: Determination of Vr_Max and Vr_Min

Second determination module TN2 determines maximum value Vr_max of the voltage at the terminals of each resonance capacitor Cr/2 and minimum value Vr_min of the voltage at the terminals of each resonance capacitor Cr/2 from average value Is_avg of output current Is, determined above, and input voltage (2) Vin. To this end, second determination module TN2 uses the expression of a voltage in a resonance capacitor. Sinusoidal voltage Vr at the terminals of each resonance capacitor Cr/2 is defined by the following formula:

$$V_r(t) = \frac{1}{2} V_{in} + U_0 \cos(2\pi F_s t).$$

In this equation Vin refers to the measurement of the input voltage of resonant DC-DC converter 1, U0 is a constant, in particular a constant representative of the amplitude of periodic voltage Vr, Fs refers, as above, to the switching frequency of transistors T1, T2 and finally t represents time. There are two identical resonance capacitors Cr/2, a first capacitor of which connected to an upper terminal of first circuit 10-1 and a second capacitor of which connected to a lower terminal of first circuit 10-1, with both capacitors being connected to their other terminal in a middle point. Resonant LLC converter circuit is, in particular, connected firstly to the middle point of resonance capacitors Cr/2, and secondly to the middle points of transistors T1, T2. According to a small-signal model analysis it is considered that these capacitors are mounted in parallel.

Secondly, the expression of the current in a capacitor is known, and therefore in this case resonance capacitors Cr/2, and the expression of resonance current Ir:

$$\frac{1}{2} C_r \frac{dV_r(t)}{dt} = \frac{1}{2} I_r(t) \tag{3}$$

et $$I_r(t) = I_{r\_peak} \sin(2\pi F_s t) \tag{4}$$

where Ir peak is the maximum value of resonance current Ir. In (3), by replacing Ir(t) by its expression given in (4), the following is obtained:

$$\frac{1}{2} C_r \frac{dV_r(t)}{dt} = \frac{1}{2} I_{r\_peak} \sin(2\pi F_s t) \tag{3bis}$$

In equation (3 bis) voltage Vr is replaced by its expression in (2). The following is thereby obtained:

$$\frac{1}{2} C_r \frac{dV_r(t)}{dt} = \frac{1}{2} C_r \frac{d\left(\left(\frac{1}{2}V_{in} + U_0 \cos(2\pi F_s t)\right)\right)}{dt} =$$

$$\frac{1}{2} I_{r\_peak} \sin(2\pi F_s t) - U_0 2\pi F_s C_r * \sin(2\pi F_s t)) = I_{r\_peak} \sin(2\pi F_s t)$$

The following is therefore obtained:

$$U_0 = \frac{-I_{r\_peak}}{2\pi C_r F_s} \tag{5}$$

Replacing Uo in (1) by its expression in (4) the following is obtained:

$$V_r(t) = \frac{1}{2} V_{in} - \frac{I_{r\_peak}}{2\pi C_r F_s} * \cos(2\pi F_s t) \tag{2bis}$$

It should be noted that Ir peak=V2 Ir RMS. Thus, in (2 bis), by replacing Ir peak by its expression, the following is found:

$$V_r(t) = \frac{1}{2} V_{in} - \frac{\sqrt{2} I_{r\_RMS}}{C_r 2\pi F_s} \cos(2\pi F_s t) \tag{2ter}$$

It is known that Vin and $$\frac{\sqrt{2} I_{r\_RMS}}{C_r 2\pi F_s}$$

are constant values. The only variable member of expression (2 ter) of voltage Vr is $\cos(2\pi F_s t)$. Since the maximum of $\cos(2\pi F_s t)$ is equal to 1, and the minimum of a $\cos(2\pi F_s t)$ is equal to −1, maximum value Vr_max of voltage Vr and minimum value Vr_min of voltage Vr can be deduced therefrom:

$$V_{r\_max} = \frac{1}{2} V_{in} + \frac{\sqrt{2} I_{r\_RMS}}{C_r 2\pi F_s}$$

$$V_{r\_min} = \frac{1}{2} V_{in} - \frac{\sqrt{2} I_{r\_RMS}}{C_r 2\pi F_s}$$

From this the expressions of maximum value Vr_max and of minimum value Vr_min are obtained, according to rms resonance current value Ir_RMS.

In addition, the expression of rms resonance current value Ir_RMS as a function of average value Is_avg of output current Is was previously determined in equation (1 ter). Thus, in the expressions of maximum value Vr_max and of minimum value Vr_min rms resonance current value Ir_RMS can be replaced by its expression given in equation (1 ter). The following is obtained:

$$V_{r\_max} =$$

$$\frac{1}{2} V_{in} + \frac{\sqrt{2}}{C_r 2\pi F_s} \sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

$$V_{r\_min} = \frac{1}{2} V_{in} - \frac{\sqrt{2}}{C_r 2\pi F_s} \sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

Step 3: Comparison Between Thresholds and Vr_Min and Vr_Max

Again with reference to FIG. 6, second determination module TN2 also includes a comparison module TNC, which makes the comparison, firstly, between a maximum voltage threshold Vr_define_max and maximum value Vr_max, and secondly between a minimum voltage threshold Vr_define_min and minimum value Vr_min. Said maximum voltage threshold Vr_define_max is, in particular, defined as the maximum voltage value at the terminals of resonance capacitor Cr/2, above which the said capacitor is overloaded. In addition, said minimum voltage threshold Vr_define_min is, in particular, defined as the minimum voltage value at the terminals of resonance capacitor Cr/2, below which the said resonance capacitor is overloaded.

Thus, a fault in resonant DC-DC voltage converter 1 is detected when maximum voltage value Vr_max is greater than or equal to maximum voltage threshold Vr_define_max, and/or when minimum voltage value Vr_min is less than or equal to minimum voltage threshold Vr_define_min. In this case the fault detection step is the detection of an overload of a resonance capacitor Cr/2.

Again with reference to FIG. 6, when a fault is detected, this is followed by a step of disconnection of resonant DC-DC converter 1, which stops the operation of resonant DC-DC converter 1. To accomplish this fault detection element UP includes a disconnection element configured to stop operation of resonant DC-DC converter 1 in the event of a fault. Comparison module TNC thus sends a stop message MS to the disconnection element of fault detection element UP of resonant DC-DC converter 1. The disconnection element receives said stop message MS, containing a stop command, which was previously sent. After receiving this stop message MS the disconnection element stops the operation of resonant DC-DC converter 1, thereby protecting resonant DC-DC converter 1 against damage to its components, where the said damage would be due to an overload.

A possible alternative to the step of disconnection of resonant DC-DC converter 1 consists of a step in which fault detection element UP would require resonant DC-DC converter 1 to operate in degraded mode but would not order a complete stop of resonant DC-DC converter 1.

The invention claimed is:

1. An electrical system enabling a direct voltage to be converted into another direct voltage, including:
    a resonant DC-DC converter including a resonant LLC converter circuit including
    a resonance inductor, two resonance capacitors and a transformer,
    a control unit including:
        a first module for determining the average value of the output current of the resonant converter over a period called the "evaluation period",
        a second module for determining a maximum value of the voltage at the terminals of each resonance capacitor and a minimum value of the voltage at the terminals of each resonance capacitor over the evaluation period, using the average value of the output current,
        a comparison module making a comparison between a maximum voltage threshold and the maximum value of the voltage at the terminals of each resonance capacitor and between a minimum voltage threshold and the minimum value of the voltage at the terminals of each resonance capacitor,
        a fault detection element configured to detect a fault in the resonant DC-DC converter if:
            the said maximum voltage value is greater than or equal to the maximum voltage threshold, or
            the said minimum voltage value is less than or equal to the minimum voltage threshold.

2. The electrical system according to claim 1, in which the resonant DC-DC converter includes a rectifier, connected to the secondary winding of the transformer.

3. The electrical system according to claim 2, in which the first determination module is configured to determine the average value of the output current, from a measuring point located at an output terminal of the rectifier, in particular a low output terminal of the rectifier.

4. The electrical system according to claim 1, in which the second determination module is configured to determine the maximum voltage value and the minimum voltage value from: the input voltage of the resonant DC-DC converter, the average value of the output current, the switching frequency of the resonant DC-DC converter, the value of the resonance capacitor, the value of output voltage Vout of the rectifier, the transformation ratio of the transformer and the primary magnetising inductor of the transformer.

5. The electrical system according to claim 1, including a filter, connected to the output of the rectifier of the resonant DC-DC converter.

6. The electrical system according to claim 1, in which the comparison module is configured such that
    the said maximum voltage threshold is a maximum authorized voltage value at the terminals of the resonance capacitor, above which in particular the said capacitor is overloaded, and
    the said minimum voltage threshold is a minimum authorized voltage value at the terminals of the resonance capacitor, below which in particular the said resonance capacitor is overloaded.

7. The electrical system according to claim 1, in which the fault detection element includes a disconnection element configured to stop operation of the resonant DC-DC converter in the event of a fault.

8. A method for detecting an overload of a resonant DC-DC converter used in an electrical system including a resonant DC-DC converter including a resonant LLC converter circuit which includes a resonance inductor, two resonance capacitors and a transformer, where the said method is characterised by the fact that it includes the steps of:
    determination, in particular of measurement, of the output current,
    determination of the average value of the said output current over a period called the "evaluation period",
    determination of a maximum value of the voltage at the terminals of each resonance capacitor, and a minimum value of the voltage at the terminals of each resonance capacitor over the evaluation period "T", using the average value of the output current, determined in the previous step,
    comparison between a maximum voltage threshold and the maximum value of the voltage at the terminals of each resonance capacitor and between a minimum voltage threshold and the minimum value of the voltage at the terminals of each resonance capacitor,
    detection of a fault of the resonant DC-DC voltage converter if the said maximum voltage value is greater than or equal to the maximum voltage threshold, and/or if the said minimum voltage value is less than or equal to the minimum voltage threshold.

9. The method according to claim 8, in which the fault detection step is the detection of an overload of a resonance capacitor.

10. The method according to claim 8, including, after the fault detection step, a step of disconnection of the resonant DC-DC converter, in which the operation of the resonant DC-DC converter is stopped.

11. The method according to claim 8, in which the maximum value of the voltage at the terminals of each resonance capacitor is determined using the following formula:

$$V_{r\_max} = \frac{1}{2}V_{in} + \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

and the minimum value of the voltage at the terminals of each resonance capacitor is determined using the following formula:

$$V_{r\_min} = \frac{1}{2}V_{in} - \frac{\sqrt{2}}{C_r 2\pi F_s}\sqrt{\left(N \times I_{s\_avg} \times \frac{\pi}{2\sqrt{2}}\right)^2 + \left(\frac{V_{out}}{4\sqrt{3} \times N \times F_s \times L_m}\right)^2}$$

where Vin is the input voltage of the resonant DC-DC converter, Cr is the value of the resonance capacitors, Fs is the switching frequency of the resonant DC-DC converter, N refers to the transformation ratio of the transformer, Is_avrg is the average value of the output current, Vout is the output voltage and Lm refers to the primary magnetizing inductor of the transformer.

* * * * *